US011797480B2

(12) United States Patent
Ostrovski

(10) Patent No.: US 11,797,480 B2
(45) Date of Patent: Oct. 24, 2023

(54) STORAGE OF ORDER BOOKS WITH PERSISTENT DATA STRUCTURES

(71) Applicant: TSX INC., Toronto (CA)

(72) Inventor: Aleksander Ostrovski, Toronto (CA)

(73) Assignee: TSX INC., Toronto (CA)

( * ) Notice: Subject to any disclaimer, the term of this patent is extended or adjusted under 35 U.S.C. 154(b) by 0 days.

(21) Appl. No.: 17/566,920

(22) Filed: Dec. 31, 2021

(65) Prior Publication Data

US 2023/0214355 A1 Jul. 6, 2023

(51) Int. Cl.
*G06F 16/13* (2019.01)
*G06F 16/14* (2019.01)
*G06F 16/17* (2019.01)

(52) U.S. Cl.
CPC .......... *G06F 16/137* (2019.01); *G06F 16/152* (2019.01); *G06F 16/1734* (2019.01)

(58) Field of Classification Search
CPC ... G06F 16/137; G06F 16/152; G06F 16/1734
USPC ........................................................ 707/747
See application file for complete search history.

(56) References Cited

U.S. PATENT DOCUMENTS

| | | | |
|---|---|---|---|
| 7,711,633 B2 | 5/2010 | Driscoll et al. | |
| 7,747,493 B1 * | 6/2010 | Monroe | G06Q 40/04 |
| | | | 705/36 R |
| 7,895,112 B2 | 2/2011 | Richmann et al. | |
| 8,660,925 B2 | 2/2014 | Borkovec et al. | |
| 8,768,821 B1 | 7/2014 | Elston | |
| 8,935,710 B1 * | 1/2015 | Marathe | G06F 9/542 |
| | | | 719/318 |
| 9,710,784 B2 | 7/2017 | Amos | |
| 10,552,735 B1 * | 2/2020 | Widerhorn | G06N 5/01 |
| 2002/0159466 A1 * | 10/2002 | Rhoades | H04L 45/742 |
| | | | 370/408 |
| 2003/0225674 A1 * | 12/2003 | Hughes, Jr. | G06Q 40/04 |
| | | | 705/37 |
| 2003/0229566 A1 * | 12/2003 | Moore | G06Q 40/00 |
| | | | 705/37 |
| 2003/0229574 A1 * | 12/2003 | Friedman | G06Q 40/06 |
| | | | 705/37 |
| 2008/0317051 A1 * | 12/2008 | Dantzig | G06F 9/5038 |
| | | | 370/400 |
| 2012/0066114 A1 * | 3/2012 | Troxel, Jr. | G06Q 40/04 |
| | | | 705/37 |

(Continued)

FOREIGN PATENT DOCUMENTS

| | | | | |
|---|---|---|---|---|
| CN | 107146155 A | * | 9/2017 | |
| EP | 3267385 A1 | * | 1/2018 | ....... G06F 17/30598 |

(Continued)

OTHER PUBLICATIONS

Bagwell et al., "RRB-Trees: Efficient Immutable Vectors", EPFL Scientific Publication, 2011, pp. 1-6. (Year: 2011).*

(Continued)

*Primary Examiner* — Phuong Thao Cao
(74) *Attorney, Agent, or Firm* — Perry + Currier Inc.

(57) ABSTRACT

An electronic message is read, and a delta is generated based on a comparison of the electronic message to an existing order book. A new order book is generated based on the delta. An event is generated based on the existing order book, the delta, and the new order book. A sequence of events, including the event, is accumulated in a queryable persistent data structure over a time span. The queryable persistent data structure thus efficiently stores representations of order books.

22 Claims, 4 Drawing Sheets

(56) References Cited

U.S. PATENT DOCUMENTS

| | | |
|---|---|---|
| 2013/0304627 A1 | 11/2013 | Warsaw, III et al. |
| 2016/0241676 A1* | 8/2016 | Armstrong ........ G06F 16/24568 |
| 2016/0292672 A1* | 10/2016 | Fay .................... G06Q 20/3829 |
| 2016/0350165 A1* | 12/2016 | LeMond ............. G06F 11/0787 |
| 2018/0232462 A1* | 8/2018 | Nordin ............. G06F 16/90348 |
| 2019/0034452 A1* | 1/2019 | Kavanagh ........... G06F 16/1734 |
| 2019/0180368 A1* | 6/2019 | Payne ................. G06F 16/2379 |
| 2019/0188794 A1* | 6/2019 | Di Genova ............ G06F 16/901 |
| 2020/0104735 A1* | 4/2020 | Irandoost ............... G06Q 40/06 |
| 2020/0294072 A1* | 9/2020 | Burton ............... G06Q 30/0204 |
| 2021/0081964 A1* | 3/2021 | Liu .................... G06Q 30/0185 |
| 2021/0174445 A1 | 6/2021 | Taylor et al. |
| 2022/0197879 A1* | 6/2022 | Jha ........................ G06F 16/217 |

FOREIGN PATENT DOCUMENTS

| | | | | |
|---|---|---|---|---|
| EP | 3435238 A1 * | 1/2019 | ......... | G06F 12/0284 |
| GB | 2518247 A * | 3/2015 | ............. | G06Q 40/00 |
| WO | WO-03107121 A2 * | 12/2003 | ............. | G06Q 40/04 |
| WO | WO-2014205543 A1 * | 12/2014 | ............. | G06Q 40/04 |
| WO | WO-2018033884 A1 * | 2/2018 | ........... | G06F 16/901 |
| WO | WO-2021207830 A1 * | 10/2021 | | |

OTHER PUBLICATIONS

He et al., "Exploring the Potential of Reconfigurable Platforms for Order Book Update", 2017 27th International Conference on Field Programmable Logic and Applications (FPL), IEEE, Sep. 4-8, 2017, 8 pages. (Year: 2017).*

Tardis.dev Software, "Introduction." Node.js Client—Tardis.dev Documentation. 2019, Accessed on Jun. 8, 2022 from URL: https://docs.tardis.dev/api/node-js#limit-order-book-reconstruction.

Kaiko Software. "Cryptocurrency Order Books." Kaiko.com 2016, Accessed on Jun. 8, 2022 at URL: https://www.kaiko.com/collections/order-books.

* cited by examiner

STORAGE OF ORDER BOOKS WITH PERSISTENT DATA STRUCTURES

BACKGROUND

Electronic trading systems, also known as electronic exchanges, allow market participants to buy and sell financial instruments, such as stocks, commodities, funds, and similar. A typical modern system operates in real time and can match and fill orders at speeds measured in milliseconds. A large number of market participants combined with very fast operations means that an electronic trading system can generate a vast amount of data.

SUMMARY

According to an aspect of the present disclosure, a device includes memory configured to store a queryable persistent data structure, a network interface configured to receive new data within a time span, and a processor connected to the memory and network interface. The processor is configured to read a message and generate a delta based on a comparison of the message to an existing order book, generate a new order book based on the delta, generate an event based on the existing order book, the delta, and the new order book, and accumulate a sequence of events, including the event, in the queryable persistent data structure over the time span.

According to another aspect of the present disclosure, a method includes reading an electronic message and generating a delta based on a comparison of the electronic message to an existing order book, generating a new order book based on the delta, generating an event based on the existing order book, the delta, and the new order book, and accumulating a sequence of events, including the event, in a queryable persistent data structure over a time span.

DETAILED DESCRIPTION

Much of the data generated by an electronic trading system is transient. An order book, for example, is a data structure that stores buy/sell orders that are waiting to be filled by new, incoming orders. The order book is updated each time an order is added, removed, or changed. A new order may be added to the book when it does not match another order present in the book. For example, an incoming buy order specifying a price of $10.15 may be stored in the order book if the lowest selling price in the book is $10.16. An order may be removed from the book when it is canceled or fully filled by a new incoming order. An order may be changed when it is partially filled by an incoming order or when the owner of the order wishes to change it. Aside from the basic examples mentioned, there are numerous types of orders, including orders having various conditions that may change the order book in different ways.

Order books are generally transient. When a change is made to an order book, the previous state is lost. The treatment of order-book data as temporary may be due to a lack of appreciation of the value of past or historic order-book data. It may be that market data, such as last trade price over time, is considered sufficient to understand a financial instrument. However, the present disclosure contemplates that past order-book data is useful. Irrespective of the value of order-book data, storing order-book data beyond what is immediately necessary for trading is not widely attempted due to the sheer amount of data involved.

An order book may have two sides: buy and sell. Each side may have a list of booked orders with relevant data such as market participant identifier (e.g., trader ID), price, volume, time, and conditions, such as time-in-force, limit or stop conditions, and similar. An order book may change at a high frequency with as little as a few milliseconds between changes. For a single instrument, such as a typical stock symbol with a fairly high degree of activity, there may be on the order of 1 million order messages per day. Storing the messages may require upwards of 500 MB of storage space. Storing order-book snapshots for such an instrument, that is, saving a copy of the order book each time it changes, may require upwards of 120 GB of storage space. Electronic trading system may handle thousands of different financial instruments, which increases the amount of data proportionally. It is impractical to use conventional techniques to store this data.

The present disclosure teaches systems, devices, and methods with persistent data structures to store order-book data. The techniques discussed herein provide for the storage of order-book data in an efficient manner with reduced storage space requirements. Further, the persistent data structures are queryable, so that order-book data may be used to facilitate improvements in trading strategies and improvements in electronic trading systems themselves.

Figure 1:
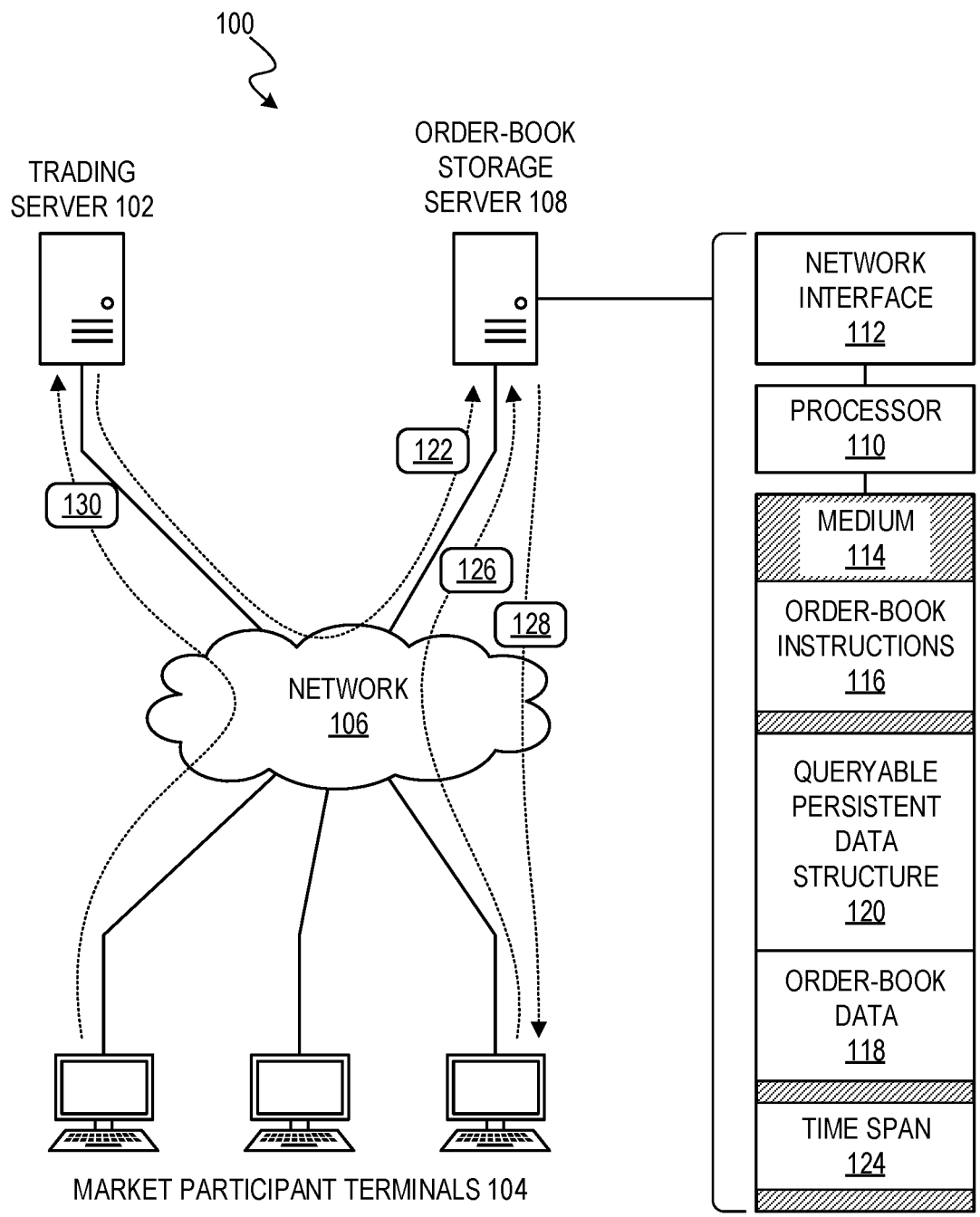
FIG. 1 is a schematic diagram of an example system to implement a persistent data structure for an order book.

With reference to FIG. 1, a computer system 100 includes a trading server 102, a plurality of market participant terminals 104, a computer network 106, and an order-book storage server 108. The trading server 102, market participant terminals 104, and order-book storage server 108 are connected to the computer network 106.

The trading server 102 includes a special-purpose computer with a processor and non-transitory machine-readable medium to receive, match, and fill orders received from the market participant terminals 104. Such orders may include new orders and cancelations and may take the form of electronic messages 130. The trading server 102 may facilitate the trading of a plurality of different financial instruments, such as various equities (e.g., stocks) under various symbols. The trading server 102 may recognize parties at the market participant terminals 104 by a market participant identifier.

Each market participant terminal 104 may include a general-purpose or special-purpose computer with a processor and non-transitory machine-readable medium to receive input data and provide output data related to trades to be carried out at the trading server 102.

The computer network 106 may include a local-area network (LAN), wide-area network (WAN), virtual private network (VPN), a mobile network, the internet, or a combination of such. The computer network 106 may be wired, wireless, or both.

The order-book storage server 108 includes a special-purpose computer with a processor 110, network interface 112, and non-transitory machine-readable medium 114. The medium 114 stores order-book instructions 116 that are executable by the processor 110, and further accumulates order-book data 118 in a queryable persistent data structure 120.

The processor 110 cooperates with the medium 114 and may also cooperate with another non-transitory machine-readable medium that includes a volatile memory, such as a random-access memory (RAM), to execute the instructions 116.

The network interface 112 includes hardware, such as a network adaptor, and software, such as a driver, to facilitate data communications via the computer network 106 and specifically with the trading server 102.

The non-transitory machine-readable medium 114 may include an electronic, magnetic, optical, or other type of non-volatile physical storage device that encodes the order-book instructions 116 that implement the functionality discussed herein and accumulates order-book data 118 in the queryable persistent data structure 120. Examples of such storage devices include a non-transitory computer-readable medium such as a hard drive (HD), solid-state drive (SSD), read-only memory (ROM), electrically-erasable programmable read-only memory (EEPROM), or flash memory.

The order-book instructions 116 may be directly executed, such as binary or machine code, and/or may include interpretable code, bytecode, source code, or similar instructions that may undergo additional processing to be executed. All of such examples may be considered executable instructions.

The order-book instructions 116 obtain source order-book data 122 from the trading server 102 and process the source order-book data 112 to accumulate order-book data 118 in the queryable persistent data structure 120. This may be done for a time span 124, such as one trading day, one hour, half an hour, five minutes, or one minute, such that the queryable persistent data structure 120 accumulates source order-book data 122 that falls within the time span 124. The time span 124 may be configurable and stored in the medium 114. The queryable persistent data structure 120 may be archived for future reference, for example, to study an order book within the time span 124. Alternatively, the time span 124 may represent a moving time window and order-book data 118 may be inserted into and removed from the queryable persistent data structure 120 according to the moving time window.

The order-book instructions 116 may respond to a query 126 directed to the queryable persistent data structure 120 to obtain an order book 128 at a point in time within the time span 124. The query 126 may be received from a market participant terminal 104 or may be local to the order-book storage server 108. The order book 128 may be communicated to the querying terminal 104 or outputted local to the server 108. A query 126 may obtain multiple order books 128 or data representative or derived therefrom.

The order-book instructions 116 may respond to the query 126 by extracting order-book data 118 from the queryable persistent data structure 120 to obtain results in the same form as the source order-book data 112. Alternatively or additionally, the order-book instructions 116 may implement a streaming query language (e.g., StreamSQL™) or a complex event processing (CEP) system, such as Esper™, to execute the query 126.

Figure 2:
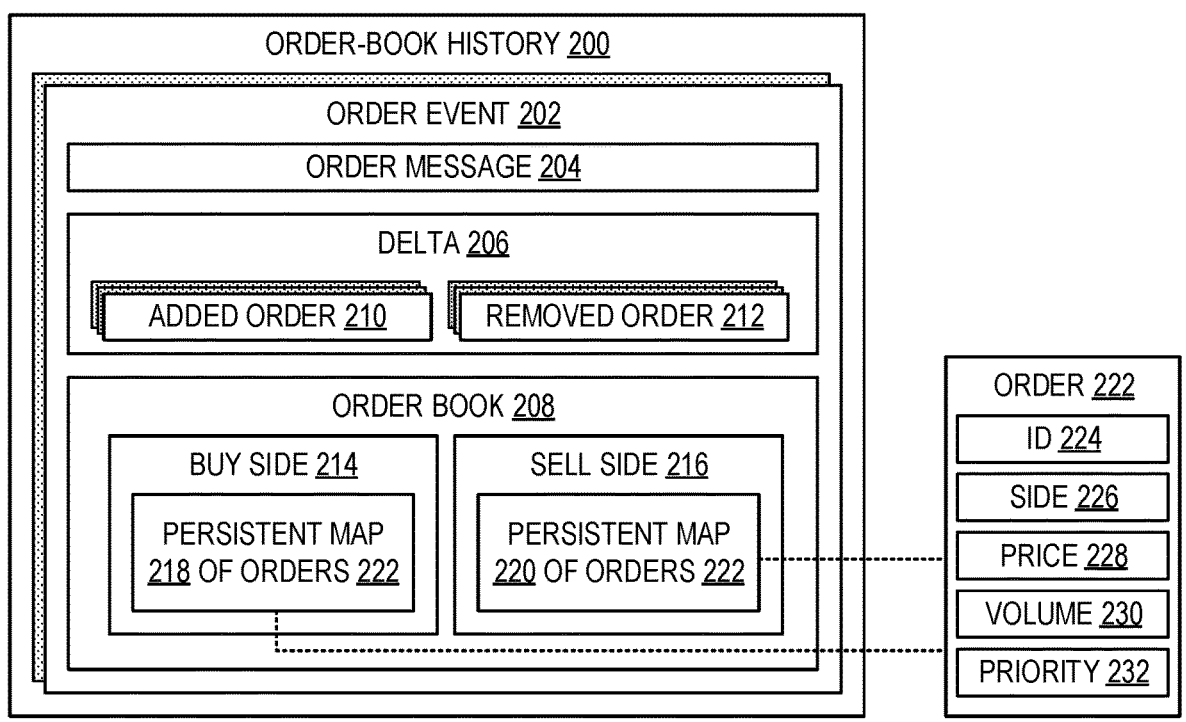
FIG. 2 is a block diagram of an example persistent data structure of an order book.

With reference to FIG. 2 an example of queryable persistent data structure 120 will now be described. The persistent data structure may be referred to as an order-book history 200. An order-book history 200 may be used for one financial instrument, such a single stock symbol. Hence, a plurality of order-book histories 200 may be used to persistently store order-book data for a plurality of corresponding financial instruments. As will be discussed below, an order-book history 200 may be implemented as a hierarchy of queryable persistent data structures.

The order-book history 200 and its particular structure, as discussed in detail below, has been discovered to be highly amenable to efficient storage of order-book data.

The order-book history 200 includes a sequence, which may be termed a list, of order events 202. Any practical number of order events 202 may exist within an order-book history 200.

Each order event 202 includes an order message 204, a change or delta 206, and an order book 208. An order event 202 represents a new version of the order book 208, brought about by a delta 206 caused by an order message 204. In some examples, the order event 202 may also store an existing or current order book 208, that is, the version immediately prior the application of the delta 206.

The sequence or list of order events 202 may be stored as a relaxed radix balance tree (RRB-tree). Such trees are described by Bagwell and Rompf in "RRB-Trees: Efficient Immutable Vectors," which is incorporated herein by reference. An example library that implements a comparable RRB-tree is "List" available at github.com/lacuna/bifurcan.

An order message 204 specifies an instruction from a market participant terminal 104 to a trading server 102 (FIG. 1). For a new order, the message 204 includes an indication of a buy or a sell side, a volume, a price, and a priority time. A message 204 representative of a new order may also indicate other information, such as stop or limit instructions as well as an identifier of a source of the order, such as a market participant identifier. The message 204 may be a cancel order that references a previous order, for example, by order identifier.

An order message 204 may be a copy of an order message 130 sent by a market participant terminal 104 to a trading server 102 (FIG. 1). Alternatively or additionally, an order message 204 may be a reconstruction of a communicated order message 130 based on log data at the trading server 102.

A delta 206 (also termed "order book change") represents changes to the order book resulting from the order message 204. The delta 206 may include any number of added orders 210 and/or removed orders 212. Lists of added orders 210 and removed orders 212 may be stored as a respective RRB-tree.

The delta 206 may be determined based on a comparison of the order message 204 to an existing order book. The comparison may effectively carry out the order represented by the order message 204 on the existing order book using the logic of the trading server 102. This may be done by replicating the order processing logic of the trading server 102 or by parsing log data of the trading server 102.

The delta 206 corresponding any order message 204 may be represented as a combination of added orders 210 and/or removed orders 212. For example, a new order that is simply booked may be represented as a single added order 210. Similarly, a cancel order may be represented as a single removed order 210, that is, the booked order being canceled. A new order that is fully filled by a single booked order may be represented by a removed order 210, that is, the booked order that fully fills the new order. Likewise, a new order that is fully filled by several booked orders may be represented by several corresponding removed orders 210. A new order that is partially filled by a single booked order may be represented by a removed order 210 and an added order 210 for the unfilled portion. Other examples are contemplated and should be apparent given the above.

The delta 206 may represent a trade that an order message 204 triggers with an order in a current order book 208.

A hash-array mapped trie (HAMT) may be used to store states of added and removed orders 210, 212. In various examples, added orders 210 are stored as HAMT and removed orders are stored as a separate HAMT. An example of an HAMT is described by Steindorfer and Vinju in "Optimizing Hash-Array Mapped Tries for Fast and Lean Immutable JVM Collections," which is incorporated herein by reference. An example library that implements a comparable tree is "Map" available at github.com/lacuna/bifurcan.

To recap the above, the order message 204 is applied to an existing or current order book to determine the delta 206. The delta 206 is applied to the existing order book to determine the new order book 208.

The new order book 208 contains a buy side 214 and a sell side 216, each of which is represented by a respective persistent map 218, 220 of orders 222. A persistent map 218, 220 may be indexed by price, such that each price maps to a persistent list of orders 222 (if any) at that price. This may be represented as:

{Price→[Persistent List of Orders]} where Price is a discrete price level,

Persistent List is a persistent list data structure, and

Order is a data structure for an order 222 that incudes identifier 224, side 226, price 228, volume 230, and priority 232 (e.g., time priority represented by a timestamp with, for example, nanosecond precision).

Discrete price levels may be currency values multiplied by a constant to be integers. For example, a currency value may be expected to have two or three digits on the right side of the decimal (e.g., $12.63). Hence, prices may be stored as integers that are currency value multiplied by 1000 (e.g., 12630) or similar constant.

The persistent map 218, 220 of discrete price levels may be stored using a Patricia tree described by Okasaki and Gill in "Fast Mergeable Integer Maps," which is incorporated herein by reference. An example library that implements a comparable tree is "IntMap" available at github.com/lacuna/bifurcan.

State of orders 222 at each price level may be stored as a sorted set by priority 232 using a persistent red-black tree. An example library that implements a comparable tree is "SortedSet" available at github.com/lacuna/bifurcan.

Figure 3:
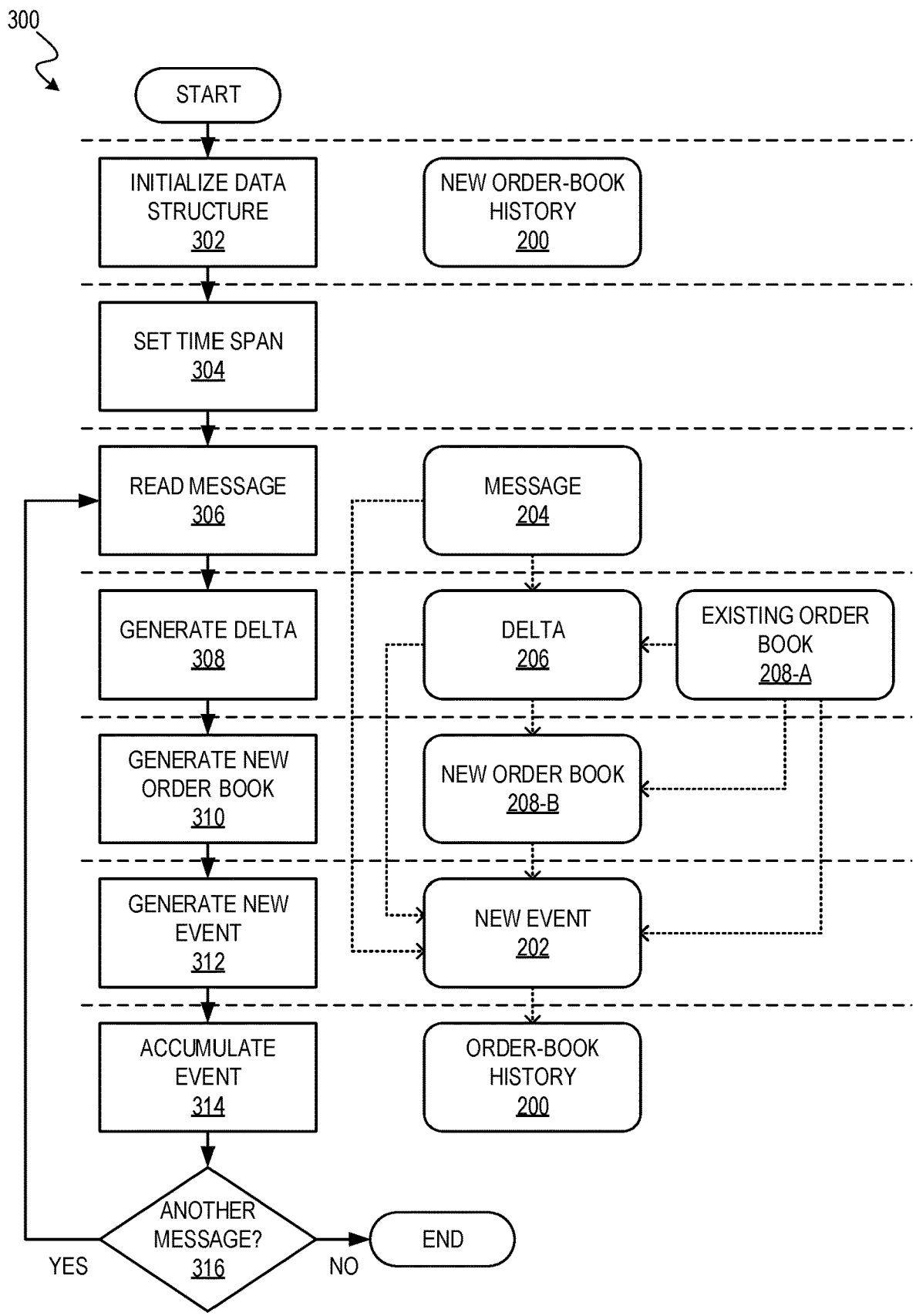
FIG. 3 is a flowchart of an example method of accumulating order book data into a queryable persistent data structure.

FIG. 3 shows a method 300 of accumulating order book data into a queryable persistent data structure. The method 300 may be implemented as processor-executable instructions, such as the order-book instructions 116 of FIG. 1. The method 300 will be described in terms of the order-book history 200 hierarchical queryable persistent data structure shown in FIG. 2.

For clarity, an existing order book is labeled as 208-A and a new or updated order book is labeled as 208-B. It should be understood that both order books 208-A, 208-B follow the same order book data structure and are merely different instances of an order book 208, discussed above.

At block 302, an order-book history 200 is initialized. This may include generating an empty list of order-book events.

At block 304, a time span is set. The time span may be a particular duration of time of interest. The time span may be fixed or may be a moving window.

At block 306, an electronic message 204 is read. The message may describe an order by a market participant to a trading system that falls within the time span.

At block 308, a delta 206 is generated based on a comparison of the message 204 to an existing order book 208-A. The message 204 may be compared to the existing order book 208-A to determine if any trades, cancelations, or other changes occur. Trades, cancelations, and other changes may be described by orders to be added to or removed from the existing order book 208-A, and these may be encapsulated as a delta 206.

At block 310, a new order book 208-B is generated based on the delta 206. The delta 206 may be applied to the existing order book 208-A to generate the new order book 208-B. For example, a list of added and/or removed orders may be applied to the existing order book 208-A.

At block 312, a new event 202 is generated based on the existing order book 208-A, the delta 206, and the new order book 208-B. This may include storing the message 204, the existing order book 208-A, the delta 206, and the new order book 208-B in mutual association.

At block 314, the event 202 is accumulated into the order-book history 200.

At block 316, it is determined whether any additional message 204 exists within the time span under consideration. If not, the method 300 ends. If so, then the method 300 repeats from block 306. Note that for the subsequent cycle, the new order book 208-B is taken as the existing order book 208-A.

Figure 4:
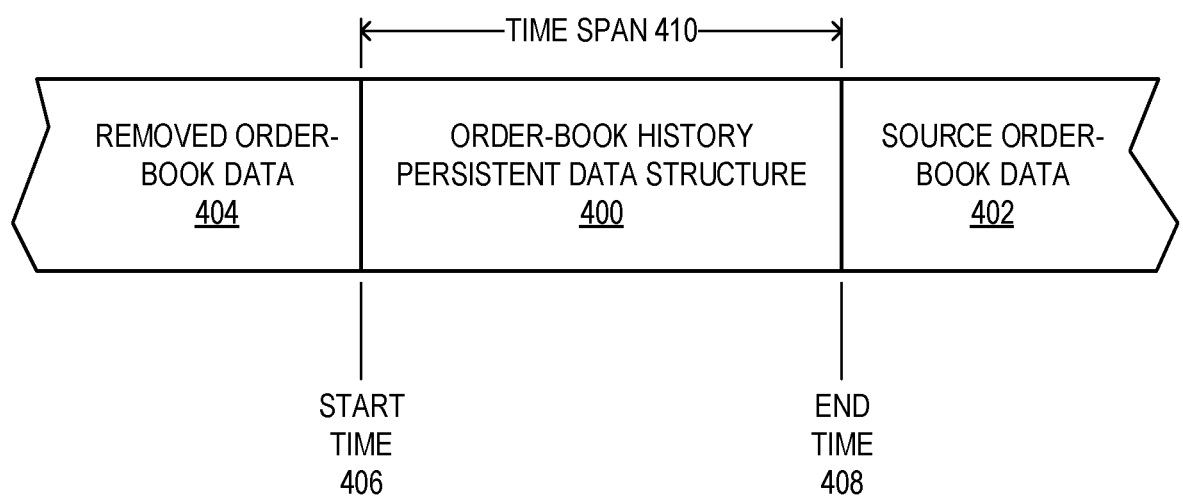
FIG. 4 is a schematic diagram of an example time span for persistent storage of an order book.

With reference to FIG. 4, an example time span for persistent storage of order-book history may be used to limit an amount of data stored.

An order-book history persistent data structure 400, such as those discussed above, may accumulate source order-book data 402 and discard accumulated data when no longer needed, shown as removed order-book data 404.

A start time 406 and an end time 408 may define a time span 410 for the persistent data structure 400. For a static time span 410, an example start time 406 is the start of the trading day (e.g., 9:30 AM) and an example end time is the end of the trading day (e.g., 4:00 PM). If a particular static time span 410 is of interest, it may be defined by respective start and end times 406, 408. For example, a particular three-minute static time span 410 may be defined with start and end times 406, 408 of 10:58 AM and 11:01 AM. Source order-book data 402 that has timestamps or other time signifiers that are later than the start time 406 and earlier than the end time 408 are processed and accumulated into the persistent data structure 400, as discussed above. The persistent data structure 400 may be discarded when no longer useful.

With regard to a dynamic or moving-window time span 410, the start and end times 406, 408 may be locked to a real-time clock. For example, for a five-minute window, the end time 408 may be locked to the current time and the start time 406 may be locked to the current time less five minutes. Hence, as new source order-book data 402 become available, it is immediately processed and accumulated into the persistent data structure 400. Further, data contained in the persistent data structure 400 is regularly tested against the start time 406 and is removed when older than the start time 406. Hence, the time span 410 may move with the current time to maintain a temporal segment of order-book history in the persistent data structure 400.

In view of the above, it should be apparent that order-book data may be stored in a highly efficient and flexible manner with the persistent data structures discussed herein. The particular arrangement of order events, deltas, and order books, discussed above, has been found to provide very large savings of storage space when applying known persistent data structures, such as the RRB-tree, HAMT, Patricia tree, and red-black tree. The hierarchy of persistent data structures disclosed was found to be very efficient for order-book data, particularly when the order-book data is arranged in the manner disclosed.

For example, it was found that the 120 GB of storage space for order-book snapshots, mentioned above, could be reduced to as low as 1 GB using the techniques discussed herein. This more than 100 times reduction in storage space is contemplated to hold for various actively traded instruments.

Moreover, the reduction is storage requirements makes it possible to run certain queries that would otherwise be cost prohibitive in terms of the required computational resources. Queries, such as what-if scenarios that change trading rules of an electronic exchange or change the behavior of a certain order types or conditions, are now able to be performed at a single computer (i.e., the server 108), when in the past such queries may have required excessive computational resources, such as a cluster of cooperating servers.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A device comprising:
    memory configured to store a queryable persistent data structure;
    a network interface configured to receive new data within a time span;
    a processor connected to the memory and network interface, the processor configured to:
        read a message and generate a delta based on a comparison of the message to an existing order book;
        generate a new order book based on the delta;
        generate an event based on the existing order book, the delta, and the new order book; and
        accumulate a sequence of events, including the event, in the queryable persistent data structure over the time span, wherein the queryable persistent data structure includes a persistent map of orders of the new order book to discrete integer price levels.

2. The device of claim 1, wherein the message comprises a new order including an indication of a buy or a sell side, a volume, a price, and a priority time.

3. The device of claim 2, wherein the queryable persistent data structure comprises a relaxed radix balanced tree to store the sequence of events, a list of order book changes, a list of current order states that define the delta, or a list of trades that define the delta.

4. The device of claim 2, wherein the queryable persistent data structure comprises a Patricia tree to store price levels including the price of the new order.

5. The device of claim 2, wherein the queryable persistent data structure comprises a persistent red-black tree to store order states and price levels, including an order state of the new order and the price level of the new order, by priority time.

6. The device of claim 2, wherein the queryable persistent data structure comprises a hash-array mapped trie to store order states that define the delta.

7. The device of claim 1, wherein the message comprises a cancel order that references a previous order including an indication of a buy or a sell side, a volume, a price, and a priority time.

8. The device of claim 2, wherein the new order triggers a trade, and subsequent events caused by the trade are accumulated into the queryable persistent data structure.

9. The device of claim 1, further comprising of a hierarchy of different queryable persistent data structures that includes the queryable persistent data structure.

10. The device of claim 1, wherein the processor is configured to respond to a query directed to the queryable persistent data structure to obtain an order book at a point in time within the time span.

11. The device of claim 1, wherein the time span is a moving window.

12. A method comprising:
    reading an electronic message and generating a delta based on a comparison of the electronic message to an existing order book;
    generating a new order book based on the delta;
    generating an event based on the existing order book, the delta, and the new order book; and
    accumulating a sequence of events, including the event, in a queryable persistent data structure over a time span, wherein the queryable persistent data structure includes a persistent map of orders of the new order book to discrete integer price levels.

13. The method of claim 12, wherein the electronic message comprises a new order including an indication of a buy or a sell side, a volume, a price, and a priority time.

14. The method of claim 13, wherein the queryable persistent data structure comprises a relaxed radix balanced tree to store the sequence of events, a list of order book changes, a list of current order states that define the delta, or a list of trades that define the delta.

15. The method of claim 13, wherein the queryable persistent data structure comprises a Patricia tree to store price levels including the price of the new order.

16. The method of claim 13, wherein the queryable persistent data structure comprises a persistent red-black tree to store order states and price levels, including an order state of the new order and the price level of the new order, by priority time.

17. The method of claim 13, wherein the queryable persistent data structure comprises a hash-array mapped trie to store order states that define the delta.

18. The method of claim 12, wherein the electronic message comprises a cancel order that references a previous order including an indication of a buy or a sell side, a volume, a price, and a priority time.

19. The method of claim 13, wherein the new order triggers a trade, and subsequent events caused by the trade are accumulated into the queryable persistent data structure.

20. The method of claim 12, comprising accumulating the sequence of events, including the event, in a hierarchy of different queryable persistent data structures over the time span.

21. The method of claim 12, further comprising responding to a query directed to the queryable persistent data structure to obtain an order book at a point in time within the time span.

22. The method of claim 12, wherein the time span is a moving window.

* * * * *